United States Patent [19]

Frederick

[11] Patent Number: 4,974,091
[45] Date of Patent: Nov. 27, 1990

[54] FOCUS LOCKING APPARATUS FOR TV CAMERA

[75] Inventor: David T. Frederick, Salunga, Pa.

[73] Assignee: Burle Technologies, Inc., Wilmington, Del.

[21] Appl. No.: 369,289

[22] Filed: Jun. 21, 1989

[51] Int. Cl.⁵ .............................................. H04N 5/30
[52] U.S. Cl. .................................... 358/227; 358/229
[58] Field of Search ............... 358/227, 225, 229, 209, 358/909; 354/400, 405

[56] References Cited

U.S. PATENT DOCUMENTS

| | | | |
|---|---|---|---|
| 3,573,367 | 4/1971 | LaRue | 358/227 |
| 4,369,470 | 1/1983 | Contant | 358/227 |
| 4,392,726 | 7/1983 | Kimura | 358/227 |
| 4,485,406 | 11/1984 | Brownstein | 358/227 |
| 4,614,974 | 9/1986 | Toyama | 358/227 |
| 4,725,863 | 2/1988 | Dumbreck | 358/227 |
| 4,742,401 | 5/1988 | Andree | 358/227 |

*Primary Examiner*—Stephen Brinich
*Attorney, Agent, or Firm*—Martin Fruitman

[57] ABSTRACT

A positive pressure focus lock for closed circuit video cameras. The carrier block to which the image sensing device is attached is moved parallel to the lens axis for focusing images at close range because of the use of a lens normally focused at infinity or changes of focus required by system tolerances. The carrier block motion is accomplished by the use of two cams on a single fixed axis. The cams press against the carrier block and move the carrier block on guide rods as the cam shaft is turned. To prevent play in the movement of the carrier block due to manufacturing tolerances on the various parts, the cams are held tightly against the carrier block by leaf springs instead of using a conventional fixed cam guide. The leaf springs' ends are attached to the carrier block and the springs act as a second bearing surface for the cams while keeping the carrier block tight against the cams regardless of tolerances or shock and vibration.

6 Claims, 1 Drawing Sheet

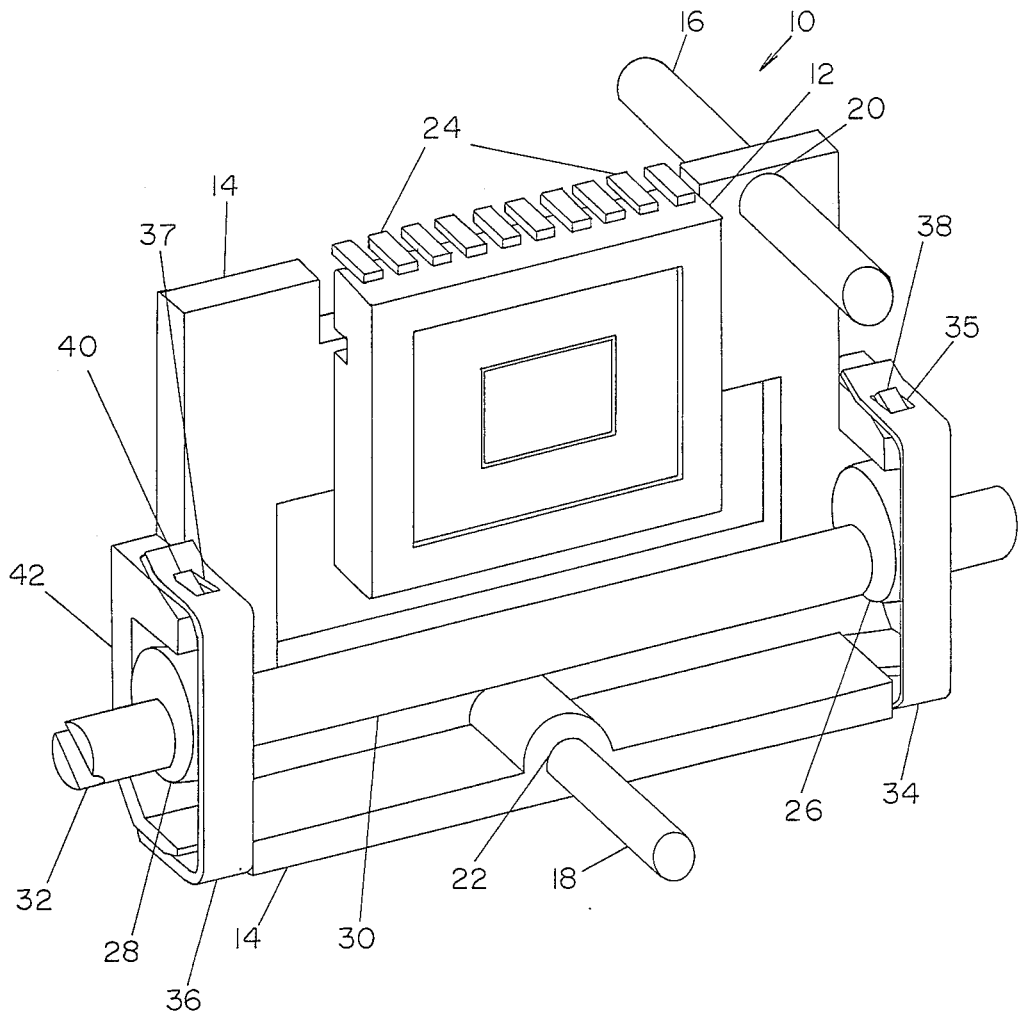

FOCUS LOCKING APPARATUS FOR TV CAMERA

SUMMARY OF THE INVENTION

This invention deals generally with TV cameras and more specifically with a focusing apparatus for such cameras.

Although the most familiar method of focusing cameras is by adjusting the location of the camera lens, there is another accepted focusing method called "back focusing". With this procedure the camera lens remains in a fixed location and the image plane, the surface upon which the image is displayed, is moved. While this method is rarely used in film cameras because of the mechanical complexity involved, it is not unusual to use it in TV cameras where the image surface is a tube or semiconductor surface for which the focusing motion is the only movement.

However, one difficulty with using back focusing is that small distances have a large effect on the system focus. This leads to a problem with small inaccuracies in parts caused by manufacturing tolerances. Tolerances in fixed mechanical parts can be accommodated by lens adjustment in that type of focusing system, but when the variation is in the locating mechanism for the image surface in a back focus system, there is no comparable counteracting system to negate focusing error. If, for instance, the image surface has enough play in its locating mechanism to permit a small position change due to external shock or vibration, readjustment will only correct the problem until the camera is again subject to the defocusing shock or vibration.

The present invention solves this problem of play in the moving parts of the back focus mechanism, and thereby furnishes a compact back focus system with a locking means which maintains the focus even with the shock or vibration of normal service.

The preferred embodiment of the present invention uses a semiconductor image sensor mounted on a flat plate called the carrier block. This carrier block rides on guide rods within holes in the carrier block. A pair of eccentric cams which are mounted on a fixed shaft are located in contact with one surface of the carrier block, so that as the cams are rotated they push the carrier plate in one direction.

To accomplish motion in the reverse direction, the conventional structure used would be a cam guide attached to the carrier block. Such a cam guide includes a fixed surface on the opposite side of the cam from the carrier block. The cam would then push against the opposite surface of the cam guide to move the carrier block in the reverse direction. In practical mechanisms, however, the distance between the two surfaces of the cam guide is always greater than the dimension across the cam. This is necessary to permit assembly of the system with typical manufacturing tolerances. It is this extra spacing between the cam and one or the other cam guide surface which gives control backlash, that is, motion of the control shaft during reversal with no equivalent reaction in the focus. It is this extra space which also makes the focus adjustment sensitive to vibration and shock.

The preferred embodiment of the invention replaces the cam guide surface opposite the carrier block with a leaf spring which is installed with a preload force so that it is always in contact with the cam and therefore eliminates the extra space between the cam and the cam guide. The spring force of the leaf spring also increases the friction between the cam and both the leaf spring and the carrier block so that neither the cam nor the carrier block will move unless moved by the positive rotation of the cam shaft.

Assembly of the mechanism is also simplified since the leaf spring is installed after the part of the cam guide on the carrier block is fitted around the cam. The leaf spring is then merely held against the cam, and holes at both ends of the spring are snapped onto retainer catches located on the carrier block.

The present invention thereby not only furnishes a control free of backlash, but, by varying the leaf spring force, can be adjusted to require varying degrees of force for the focusing control, thus effectively locking the focus control.

BRIEF DESCRIPTION OF THE DRAWING

The FIGURE is a perspective view of the preferred embodiment of the apparatus of the invention.

DETAILED DESCRIPTION OF THE INVENTION

The FIGURE is a perspective view of the preferred embodiment of back focus mechanism 10 in which semiconductor image sensor 12 is attached to carrier block 14. The focusing action of the system is accomplished by the motion of carrier block 14 as it slides on guide rods 16 and 18 which pass through holes 20 and 22, respectively, in carrier block 14. Guide rods 16 and 18 are attached to a fixed surface (not shown) of the camera body which contains the lens mount, and are located perpendicular to the plane of carrier block 14, so that they prevent it from rotating, but permit it to move in a direction perpendicular to its own plane.

Image sensor 12 is attached to carrier block 14 by conventional bonding methods, so that image sensor 12 moves along with carrier block 14. The electrical connections 24 of image sensor 12 are interconnected with other circuitry in the TV camera in which back focus mechanism 10 is installed by means of conventional flexible cables (not shown) which are only required to accommodate the small linear focusing motion of carrier block 14, which is approximately one eighth of an inch.

The movement of carrier block 14 is driven by eccentric cams 26 and 28 which are attached to rotatable shaft 30. Shaft 30 is itself anchored to the camera body by conventional bearings (not shown), so that shaft 30 and cams 26 and 28 have a fixed spatial relationship to the camera lens, which is also attached to the camera body. Since, for the preferred embodiment, the backfocusing adjustment is only used occasionally, shaft 30 is rotated by means of screw driver slot 32, but other rotating means are also possible.

As cams 26 and 28 are rotated they push against carrier block 14 to move it in one direction, and they push against leaf springs 34 and 36 to move carrier block 14 in the other direction. Leaf spring 34 has holes 35 at both ends which snap onto wedge shaped catches 35 to anchor the spring to carrier block 14. Similarly, leaf spring 36 has holes 37 which attach to catches 40. For both springs the lower holes and catches can not be seen in the FIGURE, but they are similar to the upper ones. This attachment arrangement requires that a force be applied to the springs at all times by their respective cams, so that the location of the catches and the shape of the springs must be arranged so that the spring still applies a force to the cam when the cam is causing the minimum deflection of the spring.

Assembly of the cam arrangement is also greatly simplified by the apparatus of the preferred embodiment. The spring arrangement for one side of the cam guide permits the cams to first be located within the "C" shaped portion 42 of carrier block 14, and then the leaf spring is held against the cam while its ends are deflected until the holes snap onto the catches. Hole 37 of spring 36 is shown in the figure just before it lodges on catch 40.

The present invention thereby provides a simple back focus mechanism which has no backlash, assembles easily and resists undesirable motion from shock and vibration.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. A backfocus apparatus for a TV camera comprising:
   a carrier block, movably attached to a fixed part of a camera;
   an image sensor device, attached to the carrier block, oriented so that its image sensor surface is aligned with the axis of a lens attached to the camera and oriented so that the movement of the carrier block moves the image sensor device in a direction parallel to the axis of the lens;
   a rotatable shaft attached to the camera by bearing means which is fixed in relation to the camera lens mount;
   at least one cam attached to the shaft and oriented so that on one side it is in contact with the carrier block, and, when rotated, moves the carrier block in a direction parallel to the axis of the camera lens;
   leaf spring means, attached to the carrier block, with one surface of a leaf spring means in constant contact with each cam and applying a force to the cam at a location essentially diametrically opposite from the side of the cam contacting the carrier block; and
   means to rotate the shaft.

2. The back focus apparatus of claim 1 wherein the carrier block is movably attached to a fixed part of the camera by at least two guide rods which pass through holes in the carrier block.

3. The back focus apparatus of claim 1 wherein the leaf spring means is attached to the carrier block by holes in the leaf spring means near its ends, with the holes of the leaf spring means fitting over wedge shaped catches on the carrier block and being held in place by the spring force of the leaf spring means as it applies force to the cam.

4. The back focus apparatus of claim 1 wherein the means to rotate the shaft is a screwdriver slot.

5. The back focus apparatus of claim 1 wherein the surface of the carrier block which the cam contacts has adjacent protrusions which form a "C" shape to better retain the spring clips in position.

6. The back focus apparatus of claim 1 wherein the cam means includes two separate cams.

* * * * *